United States Patent [19]
Franke et al.

[11] Patent Number: 5,383,368
[45] Date of Patent: Jan. 24, 1995

[54] DEFLECTION SENSOR FOR ROBOT LINKS

[75] Inventors: Ernest Franke; Ashok Nedungadi; Glynn Bartlett, all of San Antonio, Tex.

[73] Assignee: Southwest Research Institute, San Antonio, Tex.

[21] Appl. No.: 977,091

[22] Filed: Nov. 16, 1992

[51] Int. Cl.⁶ .............................................. G01L 1/24
[52] U.S. Cl. ........................................ 73/800; 901/47; 356/32
[58] Field of Search .................. 73/775, 794, 795, 800, 73/862.041, 862.042, 862.324, 862.624; 356/32, 141, 152, 153; 901/47

[56] References Cited

U.S. PATENT DOCUMENTS

| | | | |
|---|---|---|---|
| 3,932,039 | 1/1976 | Frey | 356/138 |
| 4,334,775 | 6/1982 | Breecher et al. | 356/152 |
| 4,570,065 | 2/1986 | Pryor | 250/231 |
| 4,623,253 | 11/1986 | Okutani et al. | 901/47 |
| 4,672,855 | 6/1987 | Schmieder | 73/862.041 |
| 4,808,064 | 2/1989 | Bartholet | 414/730 |
| 4,818,173 | 4/1989 | Khusro | 73/800 |
| 5,023,845 | 6/1991 | Crane et al. | 73/800 |

*Primary Examiner*—Robert Raevis
*Attorney, Agent, or Firm*—Gambrell, Wilson & Hamilton

[57] ABSTRACT

A robot link deflection gauge providing precise measurement of the deformation of a robot link due to load and acceleration forces. The robot link deflection gauge of the present invention includes at least one light source, a plurality of lenses and corresponding position sensitive detectors positioned at the ends of the robot arm link to accurately measure the relative position and orientation of a first (or destination) end relative to a second (or source) end of each robot arm link. Each lens has an optical axis which is positioned to receive light from the light source and focus the light into a light spot on the surface of the corresponding position detector. As the robot link is deformed so that the destination end is displaced and rotated relative to the source end, the light is transmitted away from the optical axis of each lens causing the light spot to be displaced along the surface of the respective position sensitive detector. The position sensitive detectors convert the light spots into electrical signals to provide a measurement of the displacements of the light spots relative to a predetermined origin. These displacements are converted to the relative X and Y displacement, rotation, and pitch and yaw of the destination end with respect to the source end.

1 Claim, 1 Drawing Sheet

DEFLECTION SENSOR FOR ROBOT LINKS

FIELD OF INVENTION

The present invention relates to robot link deflection gauges for measuring link deformations.

BACKGROUND

Robots are designed in a variety of different ways depending upon the particular tasks that the robot is to perform. Many robots include a base unit which may be fixed or movable, and one or more arms attached to the base where each arm may include one or more arm links. The arm links are typically coupled together by joints creating a robot arm somewhat analogous to a human arm. For example, a robot may include a base, a first link connected to the base by a first joint, a second link connected to the first link with a second joint, a third link connected to the second link with a third joint, and so on, and typically a mechanism or tool attached to the end of the arm designed for the particular application, such as for picking up and moving objects or for holding tools.

Most robots include a plurality of mechanical links, bearings, gears, motors, amplifiers and sensors, which are all typically controlled by a robot controller using motion control algorithms. The static accuracy and dynamic performance of robotics systems is typically affected by many factors, such as the mass and stiffness of the mechanical links, radial-play and end-play of the bearings, backlash of the gears, torque of the motors, the dynamic response of amplifiers and sensors, and the speed and accuracy of motion control algorithms. The actual performance of any given robot will be influenced by the above factors and also by the application of dependent factors such as the load, velocity, and the particular path followed.

Generally, the control of a system requires knowledge of the state of the robot system. In mechanical systems such as robots, the state of the system includes a knowledge of the relative location of each of the components of the system as well as the relative velocities and accelerations of each component. In typical commercial robots of prior art, the joint angles and their derivatives were the only parameters measured and calculated since these parameters roughly define the instantaneous position and relative velocities and accelerations of each link. These methods of prior art were sufficient when the robot was performing simple tasks in a well defined and unsophisticated environment.

It is desirable to design robots having greater capabilities to perform more sophisticated tasks at greater speeds. To achieve the desired increases in sophistication and speed, the state of the robot must be measured more accurately. Furthermore, the amount of backlash, end-play, and axial-play that exists in joint drives and bearings must be determined and considered to achieve more precise control. Also, as the robot work environment becomes more complex, more precise knowledge and control of the state of the robot is required in order to avoid disastrous collisions.

The knowledge of the joint angles and their derivatives does not define the state of the robot accurately enough for more sophisticated applications since many factors are ignored. For example, the robot arm links may be constructed from materials which flex under various load and acceleration forces, and the amount of deformation due to flexure must be considered. For example, when forces are applied, each arm link may be deformed so that one end of the arm link may be displaced in X and Y directions in the plane normal to the axis of the link, may roll a few degrees about the axis, or may experience pitch and yaw movements relative to the other end of the robot arm link. If these deformations are not measured and considered by the control algorithm, the state of the robot will not be accurately determined. In addition, measurement of link deflections can be used to calculate actual load for use in determining the optimum controller gain.

It is, therefore, desirable to provide a technique to more accurately determine the state of each link of each robot arm, so that when combined with the knowledge of the joint angles and their derivatives, a way is provided to more accurately determine the state of the robot and to achieve the desired level of control.

SUMMARY OF INVENTION

The robot link deflection gauge of the present invention provides for implementation of a more precise control strategy that can compensate for non-ideal bearings, links, and work space of a robot. More specifically, the present invention provides for the use and placement of sensors in each of the robot arm links to accurately measure the static and dynamic conditions of each link, such as the deformations in each of the lengths due to X and Y displacement, roll, and pitch and yaw of one end of each link with respect to the other end. This provides for more accurate knowledge of the state of the robot which is used to provide the desired control and to prevent interference with any of the objects in the environment or work space.

Each robot link has a source end, which is the end of the link closest to the base of the robot, and a destination end, which is the end of the link that is closest to the end of the arm of the robot. Deflection sensors are provided within each link of the robot arm to accurately measure the deformations of each link, by measuring the relative displacement and orientation of the destination end with respect to the source end. The robot link deflection gauge includes one or more light sources, one or more light reflecting mirrors, a plurality of optical lenses, and a plurality of position sensitive detectors (PSDs) mounted within each link. The light from the light source is collected by the lenses to form a spot of light on a surface of each of the PSDs. Each PSD includes circuitry to detect the spot of light on one of its surfaces, and provides electrical signals which allow the determination of the position of the spot of light along that surface. The orientation and displacement of one end of the link with respect to the other can be determined from knowledge of optical geometry as derived from the electrical signals from the PSDs.

More specifically, when each of the links are deformed, the light source is moved thereby displacing the light rays away from the optical axis of the lenses, which causes the spot of focused light to move on the surface of the PSDs relative to an initial origin. The electric signals from the PSDs allow the displacement of the spot of light along the surface of the PSD with respect to the origin which can then be converted to determine the displacement and orientation of one end of the link with respect to the other using the knowledge of optical geometry.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
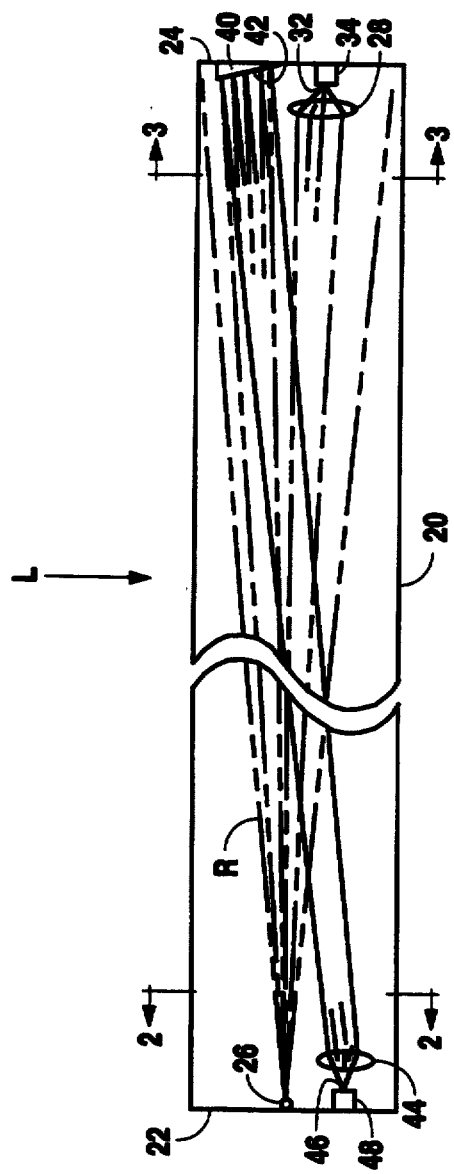
FIG. 1 is simplified diagram of a robot link according to a preferred embodiment of the present invention.

Referring now to FIG. 1, a robot arm link according to one embodiment of the present invention is shown, which is generally referred to by the letter L. Although only one robot arm link L is shown, it is understood that the robot may include one or more arms, and that each arm may include one or more robot arm links L coupled together using arm joints (not shown). The robot arm link L includes a generally cylindrical link body 20 having a hollow center area, where the link body is preferably approximately 18 inches in length, although it is understood that a link body fashioned according to the present invention could be a different shape and have a different length. The robot arm link L includes a destination end 22 and a source end 24 integrally formed at each end of the link body 20. The source end 24 is generally that end of the robot arm link L that is closest to the base or body of the robot, and the destination end 22 is that end of the robot arm link L that is most closely connected to the end of the arm of the robot.

Each of the robot arm links L is constructed from a material which flexes under load or acceleration forces causing deformation of the body 20 of the robot arm link L during use. These forces cause the destination end 22 to move or undergo translation in a plane normal to the axis of the robot arm link L such that the destination end 22 is displaced in the normal plane relative to the source end 24. This displacement has X and Y components in the normal plane.

Also, the body 20 of the robot arm link L may experience torsional forces causing rotation or roll about the axis such that the destination end 22 is rotated in the clockwise or counter-clockwise direction relative to the source end 24. Furthermore, the link body L may experience bending such that the destination end 22 experiences pitch and yaw movements relative to the source end 24 so that the destination end 22 is no longer parallel to the source end 24.

Figure 2:
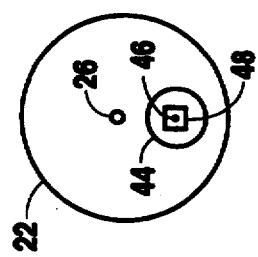
FIG. 2 is a cross-sectional end view looking along lines 2—2 of FIG. 1.

The destination end 22 includes a light source 26 which is located approximately at the center of the destination end 22, and provides light rays, generally referred to by the letter R, in a direction towards the source end 24. The light source 26 is preferably in the form of a light emitting diode (LED). FIG. 2 is a cross-sectional end view of the robot arm link L looking along lines 2—2 of FIG. 1. FIG. 2 shows that the destination end 22 is generally circular in shape and that the light source 26 is connected generally near the center of the destination end 22.

Figure 3:
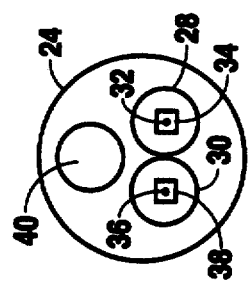
FIG. 3 is a cross-sectional end view looking along lines 3—3 of FIG. 1.

Referring now to FIG. 3, a cross-sectional end view of the robot arm link L is shown looking along the lines 3—3 of FIG. 1. The source end 24 is also preferably circular in shape. An optical lens 28 and another optical lens 30 are mounted side-by-side at the lower portion near the source end 24. The lenses 28 and 30 could either be mounted to the source end 24 or mounted to the body 20 of the robot arm link L, although the mounts are not shown for purposes of clarity.

The lens 28 has its optical axis positioned to receive some of the light rays R from the light source 26 and to focus the received light rays to form a spot of light on a surface 32 of a position sensitive detector (PSD) 34. The PSD 34 is mounted behind the lens 28 to the source end 24. Likewise, the lens 30 has its optical axis positioned to receive some of the light rays R and to focus the received light rays to form a spot of light on a surface 36 of another PSD 38. Again, the PSD 38 is mounted behind the lens 30 to the source end 24. The PSDs 34 and 38 are spaced a known distance apart from each other, and the lenses 28 and 30 are located to focus the light spots onto the surfaces 32 and 36, respectively, of the PSDs 34 and 38.

A mirror 40 is mounted to the source end 24 and includes a reflective surface 42 angled to receive some of the light rays R from the light source 26 and to reflect these received light rays back towards another optical lens 44 mounted in a similar fashion as the lenses 28 and 30, except near the destination end 22. The lens 44 is positioned to receive the reflected light rays R from the mirror 40 and has its optical axis positioned so as to focus the received light rays to form a spot of light on a surface 46 of another PSD 48 mounted to the destination end 22 behind the lens 44. The lens 44 and the PSD 48 are preferably mounted near the lower portion of the destination end 22. As will be more fully described below, the light source 26, the lenses 28, 30 and 44 and the PSDs 34, 38 and 48 form a five dimensional (5-D) deflection gauge according to the present invention capable of determining the relative displacement and orientation of the destination end 22 relative to the source end 24.

Each of the PSDs 34, 38 and 48 include sensors along the respective surfaces 32, 36 and 46 to detect a light spot and to provide electrical signals indicating the location of the light spot on the respective surfaces 32, 36 and 46. The body 20 of the robot arm link L has an initial shape which is preferably cylindrical when the robot arm link L is at rest and experiencing no external forces. In this initial rest position, the source end 24 is preferably aligned generally parallel to the destination end 22, and the link body 20 is preferably non-deformed and relatively straight so that a radial axis along the link body 20 and normal to and preferably intersects the centers of the source end 24 and the destination end 22. In the resting position, each of the lenses 28, 30 and 44 forms a light spot on the respective surfaces 32, 36 and 46 of the PSDs 34, 38 and 48 at an initial origin point as determined by the electrical signals. The link body 20 may experience permanent deformation over time and use so that the origins may change over time. This is inconsequential, however, since the new origins can be determined periodically from the electrical signals. The important factor is the displacement of the light spot from the initial origin rather than the location of the origin, as will be described below.

In general, as the robot arm link L is flexed due to load and acceleration forces causing deformation of the body 20, the destination end 22 is displaced relative to the source end 24 so that the light rays R are translated relative to the optical axis of the lenses 28, 30 and 44. When the destination end 22 is displaced, the light spots are moved relative to the initial origins on the surfaces 32, 36 and 46 of the respective PSDs 34, 38 and 48. The electrical signals from the PSDs 34, 38 and 48 allow the displacement of a spot of light from the respective origins to be measured, so that the relative position and orientation of the destination end 22 relative to the source end 24 can be calculated using optical geometry.

More specifically, if the destination end 22 is displaced in X and Y directions in the plane normal to the axis of the robot arm link L relative to the source end 24, the light source 26 is also moved so that the light rays R are translated with respect to the optical axis of the lenses 28 and 30 causing the light spots formed on the surfaces 32 and 36 of the respective PSDs 34 and 38 to be displaced from their initial origins. In the case where the motion of the destination end 22 relative to the source end 24 is in the plane normal to the axis of the robot arm link, the focused light spots on the PSDs 34 and 38 will be displaced by equal amounts. The electrical signals from the PSDs 34 and 38 allow measurement of the light spot displacements.

Applied forces may also cause the destination end 22 to rotate in the clockwise or counter-clockwise directions about the axis of the robot arm link L relative to the source end 24. This will result in different displacements of PSDs 34 and 36 relative to the light source 26 and consequently different amounts of displacement of the light spots focused on the surfaces of the PSDs 34 and 36. The electrical signals from PSDs 34 and 36 allow direct calculation of the displacements of the light spots on the surfaces of PSDs 34 and 36. The displacements of the light spots in both the X and Y directions on the surfaces of both PSDs 34 and 36 allow calculation of the X and Y displacements and the rotation of the destination end 22 relative to the source end 24.

The destination end 22 may experience pitch or yaw movements where it is no longer parallel to the source end 24. The light rays R reflected off the surface 42 of the mirror 40 are also translated with respect to the optical axis of the lens 44 causing displacement of the light spot along the surface 46 of the PSD 48 away from the initial origin. The angles of displacement of the destination end 22 relative to the source end 24 are calculated from the electric signals of the PSD 48.

In this manner, the light source 26, the mirror 40, the lenses 28, 30 and 44 and the PSDs 34, 38 and 48 form a five dimensional (5-D) deflection gauge or measurement system which provides determination of the displacement in X and Y directions, the rotation and the orientation, or pitch and yaw, of the destination end 22 of the robot arm link L with respect to the source end 24.

The PSDs 34, 38 and 48 could either be two dimensional arrays of photosensitive cells or two dimensional analog four quandrant detectors as known to those skilled in the art, although it is preferable to use analog PSDs which provide accuracies of up to ±2% of the field of view and which allow wide measurement bandwidths. The PSDs 34, 38 and 48 are also preferably capable of providing electrical signals having response times of 2 to 5 microseconds so that sample rates of 200 to 500 KHz of these electrical signals can be achieved. The signals from the PSDs 34, 38 and 48 may require normalization and scaling to compute the translation and rotation elements to determine the position and orientation of the destination end 22 relative to the source end 24. The robot typically includes a controller or computer which receives the electrical signals from the PSDs 34, 38 and 48 and performs the required normalization and scaling to calculate the respective displacements and orientations.

As appreciated by those skilled in the art, computer program computations require a certain program execution time which limits the data update rate of the electrical signals from the PSDs 34, 38 and 48. It is preferable to provide high speed parallel converters to receive the digitized signals, and use the digitized results as addresses for a read only memory (ROM) look-up table so that the desired displacements and rotations are provided directly.

In summary, a robot system generally includes a central body or base which includes one or more robot arms, where each arm includes one or more robot arm links L, and where the robot arm links L are coupled together with robot arm joints. For each arm, a first joint couples the robot body to a first robot arm link say L1, wherein the first joint angle and its derivatives provides an accurate state or position of the source end 24 of the first robot arm link L1. A robot link deflection gauge of the present invention mounted within the first arm link L1 provides an accurate determination of the destination end 22 relative to the source end 24. A second joint couples the first robot arm link L1 to a second and similar robot arm link L2, and the second joint angle and its derivatives provides the position of the source end 24 of the second arm link L2 relative to the destination end 22 of the first robot arm link L1. Further, a robot link deflection gauge mounted within the second robot arm link L2 provides an accurate determination of the relative displacement and orientation of the destination end 22 with respect to the source end 24 of the second robot arm link L2. This structure is repeated for as many robot arm links as are provided in each of the robot arms of the robot.

In this manner, it can be seen that a very precise determination of the state of each robot arm of the robot can be determined by measuring the joint angles and calculating their derivatives, and combining these measurements with the displacements and orientations of the destination ends 22 relative to the source ends 24 within each robot arm link L. Thus, the present invention provides a much more accurate determination of the state of each robot arm, which in turn allows much more precise control of the robot itself.

Although the method and apparatus of the present invention have been described in connection with preferred embodiment, it is not intended to be limited to the specific forms set forth herein, but on the contrary, it is intended to cover such alternatives, modifications, and equivalent as can be reasonably included within the spirit and scope of the invention as defined by the appended claims.

What is claimed is:

1. A robot arm link, comprising:
a flexible body having a first end and a second end;
a light source located at said first end providing light to said second end;
at least two position sensitive detectors located at said second end and displaced a known distance apart;
at least two lenses, each said lens corresponding to a corresponding one of said position sensitive detectors, wherein each said lens includes an optical axis which is positioned to receive light from said light source and to focus the received light into a light spot on said corresponding one of said position sensitive detectors, wherein when said body is flexed causing said first end to generally move in X and Y directions in a plane normal to the longitudinal axis of said body, the light received by said lenses is correspondingly translated with respect to each said optical axis of each said lens correspondingly displacing said light spots on said position sensitive detectors;

a mirror located at said second end;

a third position sensitive detector located at said first end;

a third lens corresponding to said third position sensitive detector, said third lens having an optical axis;

wherein said mirror is positioned to reflect light from said light source towards said third lens, and said optical axis of said third lens is positioned to receive the reflected light from said mirror and to focus the light into a light spot on said corresponding third position sensitive detector, wherein when said body is flexed causing said first end to rotate and experience pitch and yaw movement relative to said second end, said reflected light rays are correspondingly translated with respect to said optical axis of said third lens correspondingly displacing said light spot on said third position sensitive detector.

* * * * *